July 21, 1925.
R. G. McCURDY
1,546,392
TESTING APPARATUS
Filed June 10, 1920
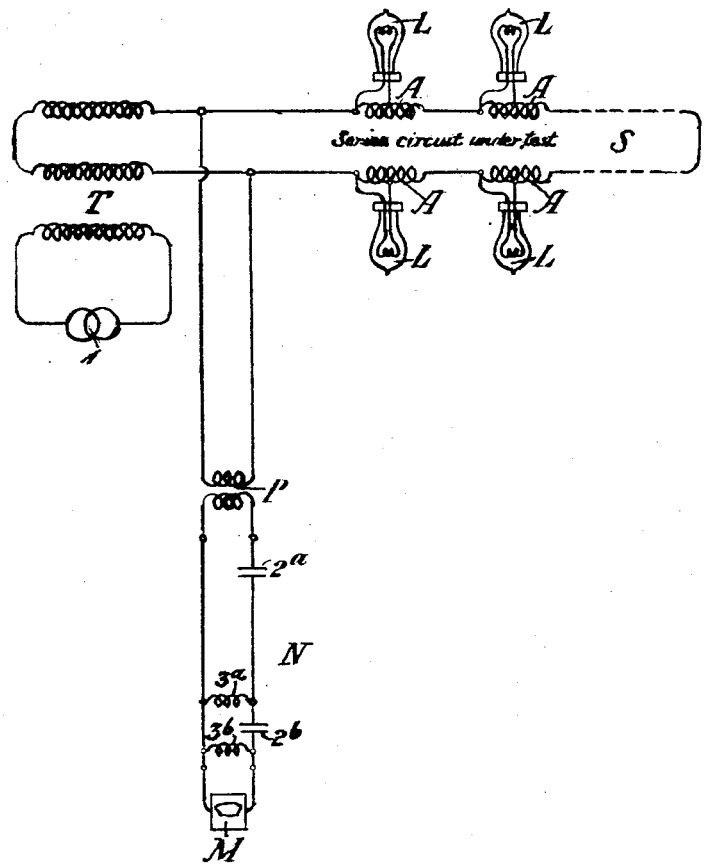
INVENTOR
R. G. McCurdy
BY
ATTORNEY Patented July 21, 1925.

1,546,392

UNITED STATES PATENT OFFICE.

RALPH G. McCURDY, OF CRESSKILL, NEW JERSEY, ASSIGNOR TO AMERICAN TELEPHONE AND TELEGRAPH COMPANY, A CORPORATION OF NEW YORK.

TESTING APPARATUS.

Application filed June 10, 1920. Serial No. 388,019.

*To all whom it may concern:*

Be it known that I, RALPH G. McCURDY, residing at Cresskill, in the county of Bergen and State of New Jersey, have invented certain Improvements in Testing Apparatus, of which the following is a specification.

This invention relates to testing apparatus and is concerned particularly with methods of and means for detecting the presence on series lighting circuits of transformers having open circuited secondaries.

In such circuits, the lamps are connected to the secondaries of individual transformers whose primaries are connected in series with each other. When the filament of a lamp burns out, the current of the lighting circuit causes over-saturation of the core of the transformer. This brings about a distortion of the voltage and current waves, in other words, the introduction of frequencies which are odd multiples of the fundamental frequency. The present invention provides an arrangement whereby the presence of the higher frequencies in the lighting circuit is shown by an indicating instrument, the scale of which may be graduated in terms of the number of lamps burned out. The indicating instrument is rendered nonresponsive to the fundamental frequency by means of a frequency selective device.

A good understanding of the invention may now be had from the following description thereof, having reference to the accompanying drawing showing in diagrammatic view one form and arrangement of circuits embodying the invention.

In this drawing, reference character 1 designates a generator which supplies current to a series lighting circuit S, through a constant current transformer T. The lamps L of the lighting circuit are associated with individual auto-transformers A, the primary windings of which are connected in series with each other in circuit S.

When the filament of a lamp burns out, it opens the secondary circuit of the corresponding auto-transformer, so that the magneto-motive force due to the secondary current is extinguished. The magneto-motive force due to the primary current, therefore, being no longer opposed by that due to the secondary current brings about an over saturation of the transformer core and causes, thus, a distortion in the current and voltage waves, which results in the introduction of upper harmonics. Owing to the leakage of flux between the movable secondary coil and the stationary primary one of transformer T, the flow of the harmonic currents is largely prevented and hence a comparatively large difference in potential consisting of the odd multiples of the fundamental frequency is created between the terminals of transformer T. This potential difference is measured by connecting across the terminals of transformer T a potential transformer P, the secondary winding of which is associated with a meter M. An impedance network N is interposed between the meter and the transformer, this network being selective as to frequency and arranged to substantially prevent the passage of current of the fundamental frequency into the meter, but to permit the flow therethrough of the upper harmonics. With all the lamps burning, therefore, the meter indication is substantially zero, but with one or more filaments burned out, the meter is actuated by current of a value dependent on the number of open secondaries. It has been found that for any particular lighting circuit the meter scale may be so calibrated as to indicate with a high degree of accuracy the number of lamps on the circuit having burned out filaments.

In the specific form of embodiment of the invention illustrated herein, the network is a so-called high-pass filter, being composed of condensers $2^a$ and $2^b$ in series, inductances $3^a$ and $3^b$ being bridged across the circuit as shown. Such a filter is described fully in patent to Campbell, 1,227,114, dated May 22, 1917, and is one which will suppress all currents of frequencies below a certain value and will pass or offer very low impedance to all currents of frequencies above that value. It has been found that for a lighting circuit whose fundamental frequency is 60 cycles, very accurate results are obtained by means of a meter of 230 ohms resistance when each condenser is 2.3 microfarads, and each inductance, 0.123 henries. The invention is not limited however to the use of the particular network illustrated it being understood that other suitable frequency selective devices may be employed.

An important application of the present invention is in connection with the elimination of interference in telephone circuits, due to currents induced therein from adjacent series lighting circuits. The fundamental wave of voltage and current in the lighting circuit is generally of 60 cycles and, therefore of too low a frequency to cause an audible disturbance in the telephone circuit. However, when there is a transformer on the circuit with an open secondary, it generates harmonics of frequencies in the audible range as explained hereinbefore, which harmonics cause noise in the telephone circuit. This invention furnishes a means of detecting the presence of such transformer or transformers in the lighting circuit, so that the burned-out lamp or lamps may be replaced.

Although I have herein shown and described only one form and arrangement of apparatus embodying the invention and only one type of method of practicing the same, it is readily understood that various changes and modifications may be made therein within the scope of the following claims without departing from the spirit and scope of the invention.

What is claimed is:

1. The method of determining the presence of a transformer with an open circuited secondary in a circuit, which consists in ascertaining the presence in the circuit of energy of higher than fundamental frequency.

2. The method of determining the number of transformers with open circuited secondaries in a series circuit, which consists in measuring the voltage of harmonics of the fundamental frequency in said circuit.

3. In a circuit comprising a source of current of fundamental frequency and a transformer having its primary in the circuit, means for determining the presence of an open circuited secondary of said transformer, consisting of a device associated with said circuit for indicating the presence of current of higher than fundamental frequency therein.

4. In combination, a circuit comprising a plurality of transformers having their primaries in series with each other, a source of current of fundamental frequency in said circuit, a current-indicating instrument associated with said circuit and responsive only to frequencies higher than said fundamental.

5. In combination, a circuit comprising a plurality of transformers having their primaries in series with each other, a source of current of fundamental frequency for said circuit, a constant current transformer interposed between said source and said circuit, a current-indicating instrument associated with the terminals of the said transformer, and means interposed between said instrument and said transformer for rendering the said instrument substantially non-responsive to said fundamental frequency but responsive to frequencies higher than said fundamental.

6. In a device for determining the presence of a transformer with an open circuited secondary in a circuit comprising a plurality of said transformers having their primaries connected in series with each other and supplied with current of fundamental frequency by a source associated with the circuit by means of a transformer having a large impedance, a measuring instrument associated with the terminals of the said last mentioned transformer, and a network of impedances interposed between the said instrument and transformer, said impedances being arranged to permit the flow into said meter of current of higher than fundamental frequency but to substantially prevent the flow thereinto of current of fundamental frequency.

7. The device of claim 6, in which the network of impedances comprises a capacity reactance in series path and an inductive reactance in shunt path.

In testimony whereof, I have signed my name to this specification this 9th day of June, 1920.

RALPH G. McCURDY.